P. H. WIEDERSUM.
Harness Saddle-Trees.
No. 126,364. Patented April 30, 1872.
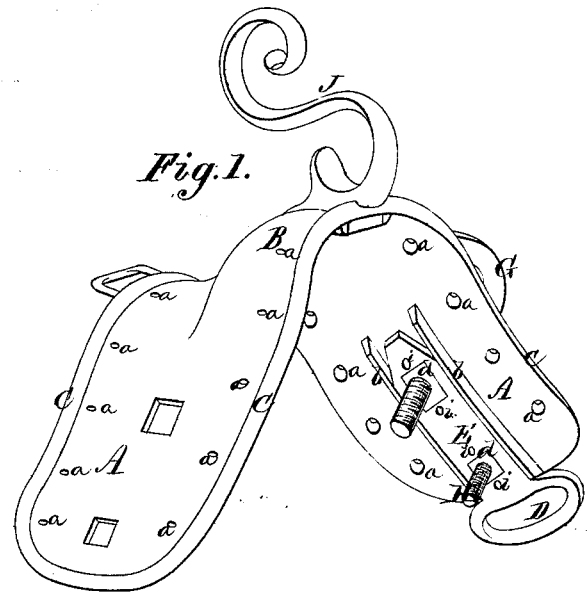
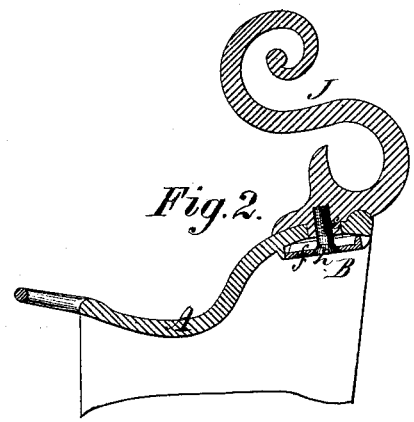

126,364

UNITED STATES PATENT OFFICE.

PHILIP H. WIEDERSUM, OF NEW YORK, N. Y., ASSIGNOR TO THE WIEDERSUM MANUFACTURING COMPANY, OF SAME PLACE.

IMPROVEMENT IN HARNESS SADDLE-TREES.

Specification forming part of Letters Patent No. 126,364, dated April 30, 1872.

SPECIFICATION.

To all whom it may concern:

Be it known that I, PHILIP H. WIEDERSUM, of New York, in the county of New York and State of New York, have invented certain new and useful Improvements in Canadian Gig Saddle-Trees; and I do hereby declare that the following is a full, clear, and exact description thereof, reference being had to the accompanying drawing and to the letters of reference marked thereon, which form a part of this specification.

My invention relates to what is known as a Canadian saddle-tree; and consists, first, in the high shape and construction of the tree and in having a flat, perfectly-smooth exterior surface; second, in a molding around the edges of the tree, said molding being a part of the same; third, in the back-band loop made with a plate extending up on the under side of the tree, and fastened by an ornamental screw, and the terret being screwed through the tree into boxes cast in or otherwise attached to the plate and fitting in square holes made in the tree; and fourth, in the check-hook, provided with a square boss fitting from the top in a square hole in the tree, and fastened by a plate and screw from underneath; all of which will be hereinafter more fully set forth.

In order to enable others skilled in the art to which my invention appertains to make and use the same, I will now proceed to describe its construction and operation, referring to the annexed drawing, in which—

Figure 1 represents a perspective view, and Fig. 2 a section of the check-hook.

A represents the saddle-tree, the center part of which is made very high at the front, as shown at B, and the entire outside surface is perfectly flat and smooth. Around the edges of the tree is formed a molding, C, which saves great trouble and expense in putting the molding on afterward, so that the saddle need not be covered with leather. This makes less work and takes less stock of leather, making a saddle which can be manufactured for less than half what an express saddle would be. The outside surface of the tree can be japanned, nickel-plated, or fine tin, and the molding either brass or silver-plated; or the entire surface can be japanned, nickel-plated, or fine tin, on account of it being a smooth surface. Around the tree, close to the molding C, are small holes $a$ $a$ for ornamental tacks or rivets to fasten the strips of leather under the tree and to fasten the flaps and sew the pads in, which makes an easy and economical job. D represents the back-band loop formed on or attached to the lower end of a plate, E, which is placed (one on each side) between two longitudinal ribs, $b$ $b$, on the under side of the tree, and fastened by means of the terret G, and an ornamental screw, H, being screwed into the rectangular bosses $d$ $d$, which fit from the under side into square holes in the tree, said bosses being cast into the plate E. In this plate are also rivet-holes $i$ $i$, so that if the terret or screw should be broken it can be easily replaced by new sockets. The loop D with plate E can be readily slipped in and out by unscrewing the terret and the ornamental screw. J represents the check-hook, provided with a square boss, $e$, which fits from the top in a square hole on the tree, and is fastened with a plate, $f$, and screw $h$ from underneath.

Having thus fully described my invention, what I claim as new, and desire to secure by Letters Patent, is—

1. The saddle-tree cast with rim or molding C, as shown and described.

2. The plate D, provided with loop D and rectangular bosses $d$, said bosses fitting into square holes in the tree, between ribs $b$ $b$, and secured by terret G and screw H, substantially as shown and described.

3. The within-described saddle-tree cast with the enlarged part B, molding C, and ribs $b$ $b$, all as described.

In testimony that I claim the foregoing as my own I affix my signature in presence of two witnesses.

PHILIP HARTMAN WIEDERSUM.

Witnesses:
GEORGE SMITH,
LEONARD J. CARPENTER.